United States Patent
Sandholm et al.

(10) Patent No.: US 10,958,694 B2
(45) Date of Patent: Mar. 23, 2021

(54) SHARING CONTENT BETWEEN COLLOCATED MOBILE DEVICES IN AN AD-HOC PRIVATE SOCIAL GROUP

(71) Applicant: Hewlett Packard Enterprise Development LP, Houston, TX (US)

(72) Inventors: Thomas E. Sandholm, Palo Alto, CA (US); Anupriya Ankolekar, Palo Alto, CA (US); Bernardo Huberman, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 358 days.

(21) Appl. No.: 14/431,209

(22) PCT Filed: Sep. 27, 2012

(86) PCT No.: PCT/US2012/057438
§ 371 (c)(1),
(2) Date: Mar. 25, 2015

(87) PCT Pub. No.: WO2014/051577
PCT Pub. Date: Apr. 3, 2014

(65) Prior Publication Data
US 2015/0304369 A1    Oct. 22, 2015

(51) Int. Cl.
*G06Q 10/10* (2012.01)
*G06F 3/0482* (2013.01)
(Continued)

(52) U.S. Cl.
CPC .......... *H04L 65/403* (2013.01); *G06F 3/0482* (2013.01); *G06F 3/04842* (2013.01);
(Continued)

(58) Field of Classification Search
CPC ... H04L 65/403; H04L 12/1822; H04L 51/32; G06F 3/0482; G06F 3/04842;
(Continued)

(56) References Cited

U.S. PATENT DOCUMENTS 7,047,279 B1    5/2006   Beams et al.
7,958,453 B1 *  6/2011   Taing .................. H04L 12/1827
                                                          709/204

(Continued)

FOREIGN PATENT DOCUMENTS

| JP | 2004164377 A | 6/2004 |
| JP | 2012155672 A | 8/2012 |
| KR | 10-2012-0053981 A | 5/2012 |

OTHER PUBLICATIONS

W. Keith Edwards, Mark W. Newman, et al. "Using Speakeasy for Ad Hoc Peer-to-Peer Collaboration," Nov. 2002, ACM CSCW '02.*

(Continued)

*Primary Examiner* — Andrew T Chiusano
(74) *Attorney, Agent, or Firm* — Hewlett Packard Enterprise Patent Department

(57) ABSTRACT

A content sharing platform for sharing content between collocated mobile devices in an ad-hoc private social group is disclosed. The content sharing platform enables users of collocated mobile devices to discover an ad-hoc private social group. A content group identifier identifying a content group is shared with users in the ad-hoc private social group. The content group identifier enables users in the content group to access a web user interface to share content with the content group. The users' interactions with the content are processed in real-time for all the collocated mobile devices in the content group. The content sharing platform displays context-aware and history-aware features of the content through the web user interface. Users of the content sharing (Continued)

platform may share, interact and collaborate with content in real-time in their collocated mobile devices.

4 Claims, 18 Drawing Sheets

(51) Int. Cl.
| | |
|---|---|
| *G06F 3/0484* | (2013.01) |
| *H04W 4/029* | (2018.01) |
| *H04W 4/021* | (2018.01) |
| *H04L 29/06* | (2006.01) |
| *G06Q 50/00* | (2012.01) |
| *H04W 4/80* | (2018.01) |
| *H04W 4/21* | (2018.01) |
| *H04L 12/58* | (2006.01) |
| *H04L 12/18* | (2006.01) |
| *H04W 4/08* | (2009.01) |
| *H04W 8/00* | (2009.01) |
| *H04W 84/18* | (2009.01) |

(52) U.S. Cl.
CPC ............ *G06Q 10/10* (2013.01); *G06Q 50/01* (2013.01); *H04L 12/1822* (2013.01); *H04L 51/32* (2013.01); *H04W 4/021* (2013.01); *H04W 4/029* (2018.02); *H04W 4/08* (2013.01); *H04W 4/21* (2018.02); *H04W 4/80* (2018.02); *H04W 8/005* (2013.01); *H04W 84/18* (2013.01)

(58) Field of Classification Search
CPC ....... G06Q 10/10; G06Q 50/01; H04W 4/008; H04W 4/02; H04W 4/021; H04W 4/08; H04W 4/206; H04W 8/005; H04W 84/18; H04W 4/029; H04W 4/21; H04W 4/80
See application file for complete search history.

(56) References Cited

U.S. PATENT DOCUMENTS

| | | | |
|---|---|---|---|
| 8,225,197 B1 | 7/2012 | Szewczyk | |
| 9,436,927 B2* | 9/2016 | Saliba | G06Q 10/10 |
| 2005/0108299 A1 | 5/2005 | Nakajima | |
| 2006/0041632 A1 | 2/2006 | Shah et al. | |
| 2007/0245238 A1* | 10/2007 | Fugitt | G06F 3/0481 |
| | | | 715/700 |
| 2008/0091777 A1* | 4/2008 | Carlos | G06Q 10/10 |
| | | | 709/204 |
| 2008/0209327 A1* | 8/2008 | Drucker | G06F 9/542 |
| | | | 715/733 |
| 2009/0030918 A1* | 1/2009 | Lowry | G06F 17/30008 |
| 2009/0119602 A1 | 5/2009 | Nishiyama | |
| 2009/0235181 A1* | 9/2009 | Saliba | G06Q 10/10 |
| | | | 715/753 |
| 2010/0122271 A1* | 5/2010 | Labour | G06F 16/95 |
| | | | 719/328 |
| 2010/0268694 A1 | 10/2010 | Denoue et al. | |
| 2011/0126130 A1 | 5/2011 | Lieb et al. | |
| 2011/0184960 A1 | 7/2011 | Delphia et al. | |
| 2011/0252339 A1* | 10/2011 | Lemonik | G06F 17/2288 |
| | | | 715/753 |
| 2011/0279638 A1 | 11/2011 | Periyannan et al. | |
| 2012/0102050 A1* | 4/2012 | Button | G06N 5/043 |
| | | | 707/749 |
| 2012/0110429 A1 | 5/2012 | Tzonis et al. | |
| 2012/0159308 A1* | 6/2012 | Tseng | G06F 40/14 |
| | | | 715/234 |
| 2012/0220263 A1* | 8/2012 | Smith | H04W 4/60 |
| | | | 455/410 |
| 2012/0317487 A1 | 12/2012 | Lieb et al. | |
| 2012/0328259 A1* | 12/2012 | Seibert, Jr. | G06F 17/212 |
| | | | 386/230 |
| 2013/0018960 A1* | 1/2013 | Knysz | H04L 65/403 |
| | | | 709/204 |
| 2013/0036196 A1* | 2/2013 | Chan | H04N 21/42202 |
| | | | 709/217 |
| 2013/0055289 A1* | 2/2013 | Maltese | H04L 29/0809 |
| | | | 719/320 |
| 2013/0104054 A1* | 4/2013 | Cao | G06F 3/038 |
| | | | 715/753 |
| 2013/0324169 A1* | 12/2013 | Kamal | H04W 4/80 |
| | | | 455/466 |
| 2014/0109115 A1* | 4/2014 | Low | G06F 9/44526 |
| | | | 719/328 |
| 2015/0319197 A1* | 11/2015 | Capt | H04W 4/06 |
| | | | 709/203 |

OTHER PUBLICATIONS

Fails, J.A. et al., Mobile CollaborationL Collaboratively Reading and Creating Children's Stories on Mobile Devices, (Research Paper), Proceedings of the 9th International Conference on Interaction Design and Children, Jun. 9-12, 2010, pp. 20-29.
How It Works, (Web Page), Retrieved Sep. 28, 2015, 1 Page.
International Searching Authority, The International Search Report and the Written Opinion, dated Jan. 9, 2014, 11 Pages.
Kune-A Web Tool to Encourage Collaboration, Content Sharing & Free Cultute, (Web Page), 2 Pages, Retrieved Sep. 28, 2015.
Pering, T. et al., Enabling Pervasive Collaboration with Platform Composition, (Research Paper), Proceedings of the 7th International Conference on Pervasive Computing, 2009, pp. 184-201.
Mayibongwe Nkambule, "Capturing a screenshot showing mouse cursor in KDE", available online at <https://msnkambule.wordpress.com/2010/04/09/capturing-a-screenshot-showing-mouse-cursor-in-kde/>, LifeSpin, KDE, Programming, Apr. 9, 2010, 9 pages.
PCT Search Report/Written Opinion—Application No. PCT/US2012/057438 dated Apr. 29, 2013—pp. 11.

* cited by examiner

# SHARING CONTENT BETWEEN COLLOCATED MOBILE DEVICES IN AN AD-HOC PRIVATE SOCIAL GROUP

BACKGROUND

The proliferation of the Internet has facilitated the sharing and distribution of content like never before. Users now flock to websites, search engines, and social networks to access and share content from multiple devices and locations around the world. The devices may include personal and portable computers, phones, tablets, video game consoles, personal digital assistants or any device configured to access the Internet. The access may be wired or wireless, with wireless access growing much faster. It is predicted that by 2016 there will be more wireless devices than people in the world.

Along with the rise in popularity of wireless devices, there has been a growing demand for content sharing platforms that are targeted specifically for the mobile user. These include, for example, Instagram for sharing photos. Foursquare for sharing location information, Facebook Mobile and Google+ Mobile for sharing content with friends, Twitter Mobile for sharing short messages, and Google Docs Mobile for sharing documents, among others. These content sharing platforms enable users to easily share content among their social network peers. However, they are not optimized to let users share and interact with content instantly and securely in real-time in ad-hoc private social groups in arbitrary devices.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
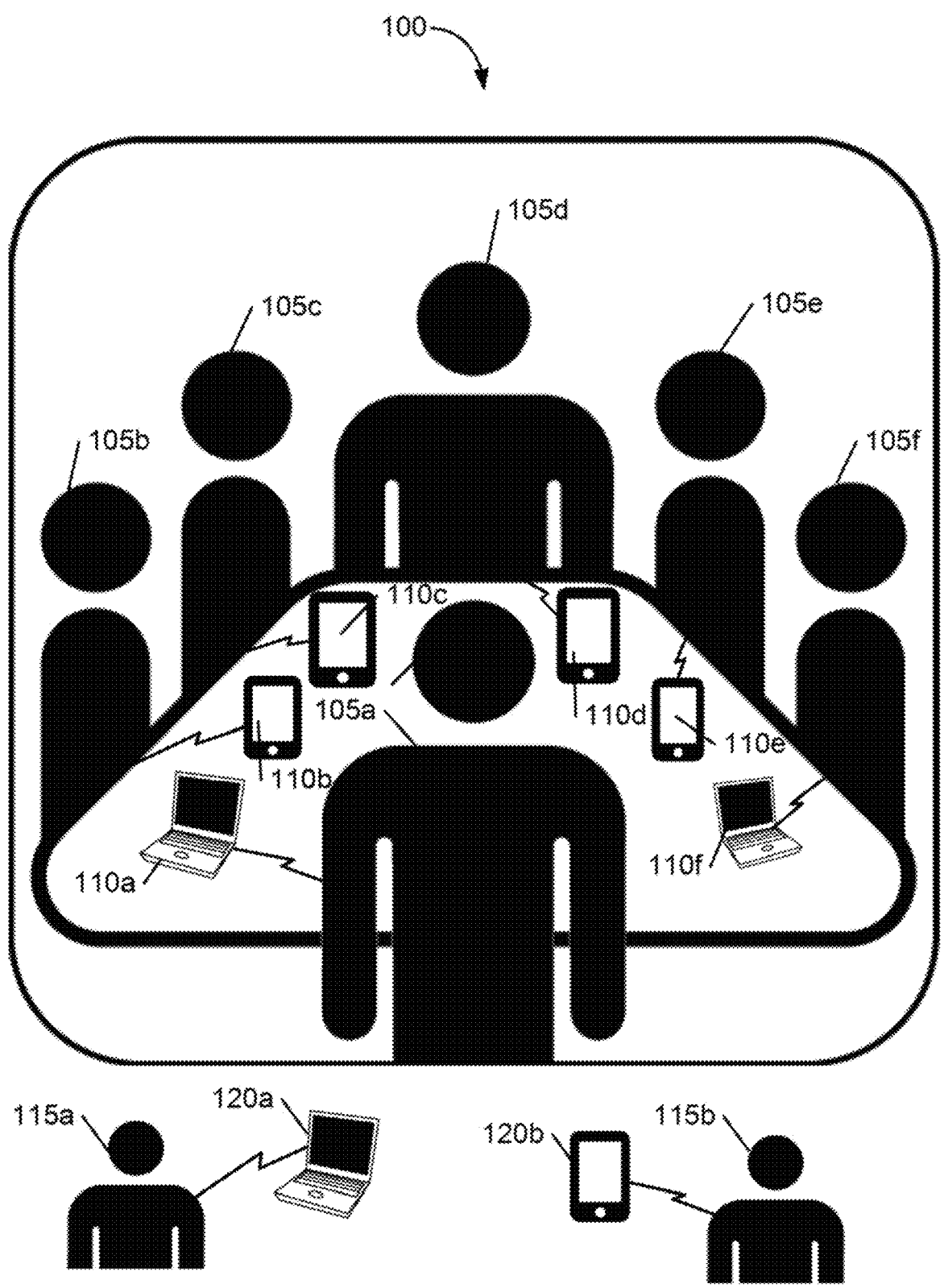
FIG. 1 illustrates a schematic diagram of an environment where the content sharing platform is used in accordance with various examples.

A content sharing platform for sharing content between collocated mobile devices in an ad-hoc private social group is disclosed. The content sharing platform enables users in a private group to share, collaborate, and interact with content seamlessly across mobile devices in real-time. The mobile devices may be physically collocated in a physical venue such as, for example, a conference or meeting room, or located remotely if the users are granted access to the private group. The private group may be formed ad-hoc by invitation or by automatically discovering the users' location.

In various examples, the content sharing platform may be accessed from a web page without any plug-ins and across any number of devices, operating systems, and browsers. The content sharing platform may also support numerous form factors, all the way from big projector screens down to small screen sizes in mobile phones. Users of the content sharing platform may share, interact and collaborate with context-aware and history-aware content in real-time.

As generally described herein, context-aware content refers to content that is enhanced with the users' context, such as, for example, the users' location, emotional and physical state, attention focus (e.g., which part of the content is being shared), objects and people in the users' environment, historical state of the content, among others. Users' annotations and meta information such as related links, notes and instant messaging chats may all be tied to the part of the content the users are referring to at any given time. History-aware content refers to content that is enhanced with a timeline of content sharing actions. The timeline tracks and records content sharing actions to produce minutes from the shared content that may be revisited off-line.

As described in more detail herein below, the content sharing platform has four main modules: (1) a cross platform web interface module to enable users to share, interact and collaborate with context-aware and history-aware content seamlessly in real-time from their mobile devices; (2) a native bridge module to access native mobile device features from the web interface module; (3) a real-time messaging module to process events and messages to/from the users; and (4) a content management module to process the context-aware and history-aware content through the real-time event messaging module. The context-aware and history-aware content may be hosted by a cloud service in communication with the real-time event messaging module.

It is appreciated that, in the following description, numerous specific details are set forth to provide a thorough understanding of various examples. However, it is appreciated that the examples may be practiced without limitation to these specific details. In other instances, well known methods and structures may not be described in detail to avoid unnecessarily obscuring the description of the examples. Also, the examples may be used in combination with each other.

Referring now to FIG. 1, a schematic diagram of an environment where the content sharing platform is used in accordance with various examples is described. Users 105a-f are collocated in a physical space 100 to share, interact and collaborate with context-aware and history-aware content viewed in their mobile devices. The physical space 100 may be a conference or meeting room, or any other space where the users 105a-f may be located in proximity to each other. The users 105a-f may be accessing content in any type of mobile device, including, but not limited to, laptops (e.g., laptop 110a and 110f), mobile phones (e.g., mobile phone 110b and 110e), tablets (e.g., tablet 110c and 110d), video game consoles (not shown), and personal digital assistants (not shown), among others. The context-aware and history-aware content may include documents, photos, videos, webpages, and any other type of content that may be accessed in a mobile device.

The users 105a-f share content in a private social group that may be formed ad-hoc by invitation or by automatically discovering the users' location (e.g., via GPS or Wi-Fi positioning). There are two types of ad-hoc private social groups that users may join: content groups and local groups. Content groups are formed ad-hoc to share specific content with members of the group. The content groups are identified by a group name that is preferably secure and not easily discoverable by others (e.g., by using Globally Unique Identifiers "GUIDs" for group names). A content group may be created by anyone with access to the content sharing platform as described below. The group creator can share the group name or URL corresponding to the group name with other users to invite them to join the group. The only way to access content shared in a content group is by knowing its URL. If the content group name and hence its URL are not easily discoverable, then the only way to access content shared in the content group is to receive its URL from the group creator or another group member. Anyone having access to the content group has full read, write, upload, and control access to the content therein.

Local groups are groups associated with a given location. The location may be the user's physical location (e.g., physical space 100) or it may be a custom place created and pinned to a geographic location. This place can be a public venue such as a restaurant in Foursquare or it can be a place the user created and tagged to a geolocation. By tagging a local group to a geolocation, the group becomes discoverable through vicinity searches. Users may automatically discover a local group based on their device's location (e.g., from GPS). The local group may also be virtual to allow remote users to participate in the group. These virtual local groups can thus be seen as a virtual team that meets regularly.

A user of a local group may also discover other users located nearby to share content with, including a URL of a content group. The user can broadcast a content group name to anyone in a local group or selectively pick users to invite. Local groups can thus be used to broadcast and distribute URLs of content groups securely. Only the users in a local group receiving a URL corresponding to a content group will have access to the content shared in that group.

For example, users 105a-f may automatically join a local group associated with their location. Once in the local group, users 105a-f can receive a URL corresponding to a content group from a member or members of the group by email, Short Message Service ("SMS"), Quick Response ("QR") code, Near Field Communication ("NFC") tags, local group broadcast, or any other channel that may be used to communicate URLs. As described in more detail herein below, the URL directs the users 105a-f to a cross platform web interface that enables them to share, interact and collaborate with context-aware and history-aware content seamlessly in real-time from their mobile devices 110a-f.

It is appreciated that users 105a-f may form an ad-hoc private social group instantaneously and on the fly from any of their mobile devices 110a-f. Users 105a-f may be collocated in physical space 100 (e.g., a meeting or conference room) and all that is required for them to form an ad-hoc private social group is a way to connect to the Internet from their mobile devices without relying on GPS, QR code, e-mail, SMS, Bluetooth, NFC or any other hardware supported near field radio technology. Users 105a-f can access the cross platform web interface from a web browser client in their mobile devices 110a-f and automatically discover a local group. A user can then create a content group and invite other users in the local group to join the content group where content is shared.

It is also appreciated that any one of the users 105a-f may share content with users in the content group at any given time. There is no single leader in the content group that controls the sharing of the content. All users may share, interact and collaborate with the content. The content and content navigation actions may be shared with all users 105a-f in the content group. It is also appreciated that although users 105a-f are collocated, remote users may also interact with users 105a-f in the content group if they are granted access to the group. For example, remote user 115a may access the content being shared by users of the content group in a laptop 120a and remote user 115b may access the content in a mobile phone 120b. The remote users 115a-b may be granted access to the content group by receiving the URL corresponding to the group via email, SMS, or other means.

It is further appreciated that the content sharing platform enables content to be shared by users in a number of different environments. For example, the content sharing platform may be used in enterprise meetings to share content among the meetings' participants, classrooms to share content among the students and teachers in the classroom, live event audience engagements at stadiums, concert halls and conferences, emergency planning and crew coordination at airplanes, trains, ships, etc., and collaborative journalism, architecture, and advertising, among other environments.

Figure 2:
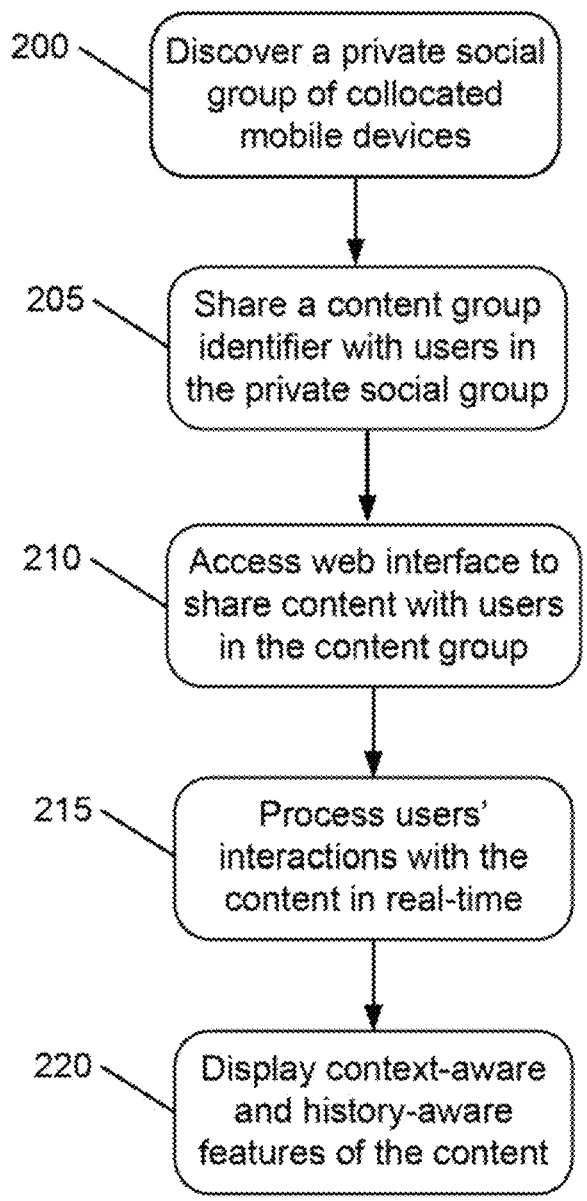
FIG. 2 illustrates a flowchart for sharing content between collocated mobile devices in a private social group.

Referring now to FIG. 2, a flowchart for sharing content between collocated mobile devices in a private social group is described. First, users discover a private social group of collocated mobile devices (200). The private social group may be a local group discoverable by users by associating their mobile devices to a location (e.g., either the physical location of the users given by a geolocation API, or a nearby location discoverable by the content sharing platform, a Foursquare venue, etc.). As described above, all that is required for the users to discover a local group is a way to connect to the Internet from their mobile devices without relying on GPS, QR code, e-mail, SMS, Bluetooth, NFC or any other hardware supported near field radio technology. Users can access the cross platform web interface from a web browser client in their mobile devices and automatically discover a local group. A user can then create a content group and invite other users in the local group to join the content group where content is shared. A content group identifier corresponding to a content group is shared with the users within the private social group (205). The content group identifier may be encoded within a URL, QR code, NFC tag, or any other identifier that may be shared with collocated mobile devices.

The content group identifier enables the users in the content group to access a cross-platform web user interface described in more detail herein below. The identifier may be shared by any member in the private social (e.g., local) group. For example, the URL http://www.crowdee.com/snap/main.html?group=sandbox identifies a group named "sandbox" for the users to join. The users may access the group by, for example, receiving the URL from a member or members of the local group by email or SMS, automatically discovering the URL through a QR code or NFC tag, receiving a broadcast to their physical location discovered through a geolocation API, or through any other channel that may be used to communicate URLs.

It is appreciated that the URL identifying a private social group may be created by anyone by specifying a name or unique identifier. The name or unique identifier may be specified to be hard to guess by others outside of the group (e.g., with a random group name such as t67dg8a or a Globally Unique Identifier "GUID"). The URL can be viewed by any user having access to the URL, either a user of a mobile device collocated with other mobile devices of users in the group or a user of a remote mobile device.

It is also appreciated that the URL is not discoverable by others outside of the private social group. The URL may be distributed securely and privately among members of the group. In various examples, the content sharing platform may be run within an enterprise Intranet environment with privacy and security mechanisms in place. The content itself may be stored in secure locations requiring authentication, or be subject to transport level and message level encryption to prevent security and privacy breaches.

The users enter the URL in a web browser to access the cross-platform web user interface to share, interact and collaborate with content viewed in their mobile devices (210). Users may share content by uploading documents (e.g., text documents, multimedia documents, images, video, etc.) from their mobile devices or the web (e.g., web links, web documents, bookmarklet, etc.). The documents may be uploaded in any file format such as, for example, pdf, ppt, doc, xls, jpg, png, gif, and so on. Users may take pictures or video with their mobile devices and upload them instantly to be shared with the private social group. Once a user uploads content with the user interface, the content is immediately visible to the other members of the group. Any user in the group may then view and interact with the content. A user in the group may also choose to upload other content to be shared with the group at any given time. As described above, there is no single leader in the private social group that controls the sharing of the content. All users may share, interact and collaborate with the content.

The users' interactions with the uploaded content are processed by the content sharing platform in real-time (215). The user's interactions with the content are simultaneously displayed at all collocated mobile devices and may include, for example, collaborative cross-device navigation of multi-page documents (e.g., when a user flips a page in a document, all users in the private group see the page being flipped to the next page), collaborative multi-document navigation, annotations into the document by any user in the group, instant messaging conversations between users in the group, timeline navigation (described below), or any other type of content interaction that may be performed by a user in a mobile device.

The content sharing platform also displays context-aware and history-aware features of the content while the content is being shared with the group (220). The context-aware features may include notes, annotations or comments from users in the group, related links (e.g., Wikipedia links) about topics in the content being shared, instant messaging conversations between users in the group, and so on. The history-aware features include a timeline of all uploaded and shared content so users in the group can revisit the content shared off-line. These history-aware features effectively enable the content sharing platform to create collaborative minutes of a users' content sharing session automatically.

Figure 3:
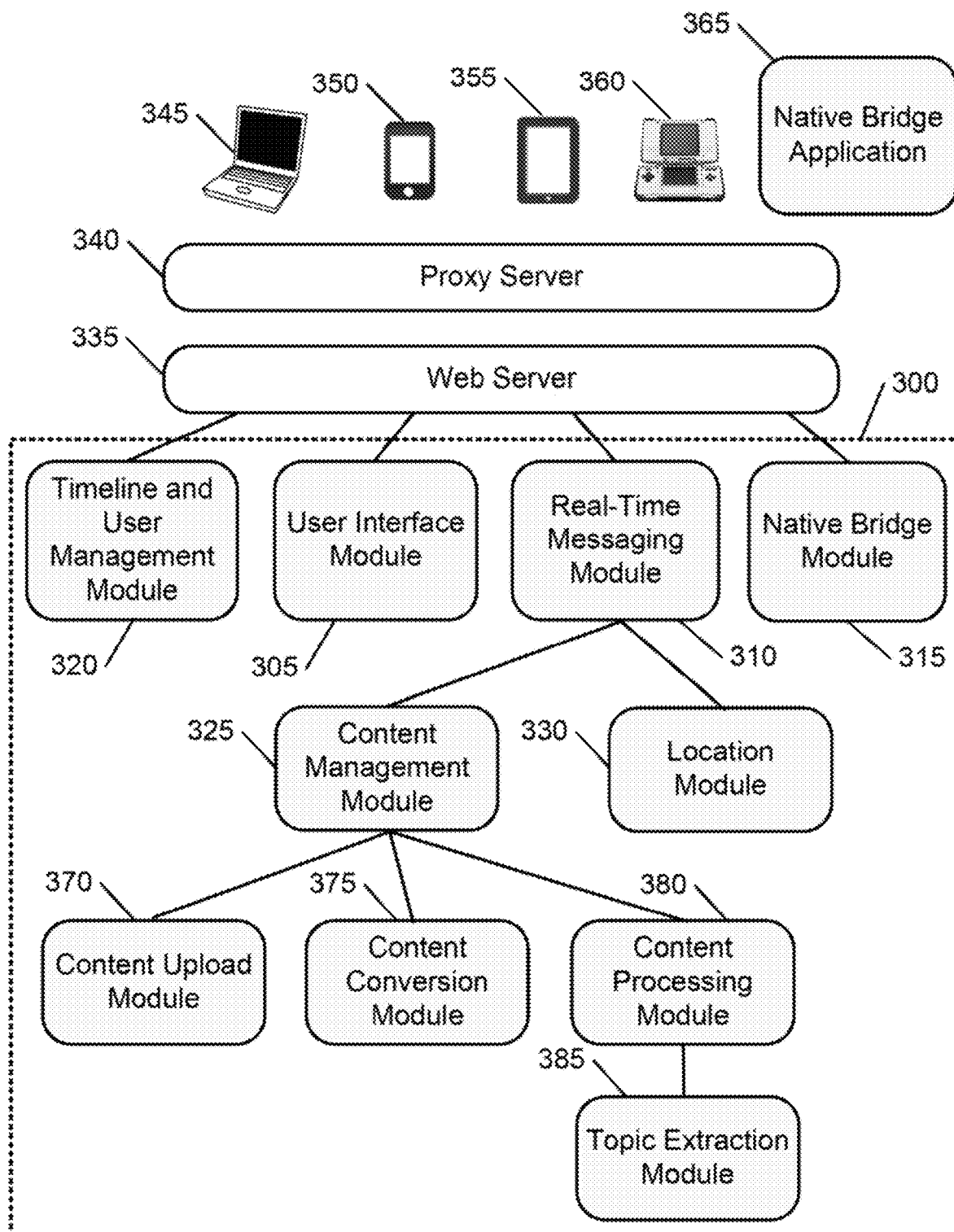
FIG. 3 illustrates a schematic diagram of a content sharing platform architecture in accordance with various examples.
Figure 4:
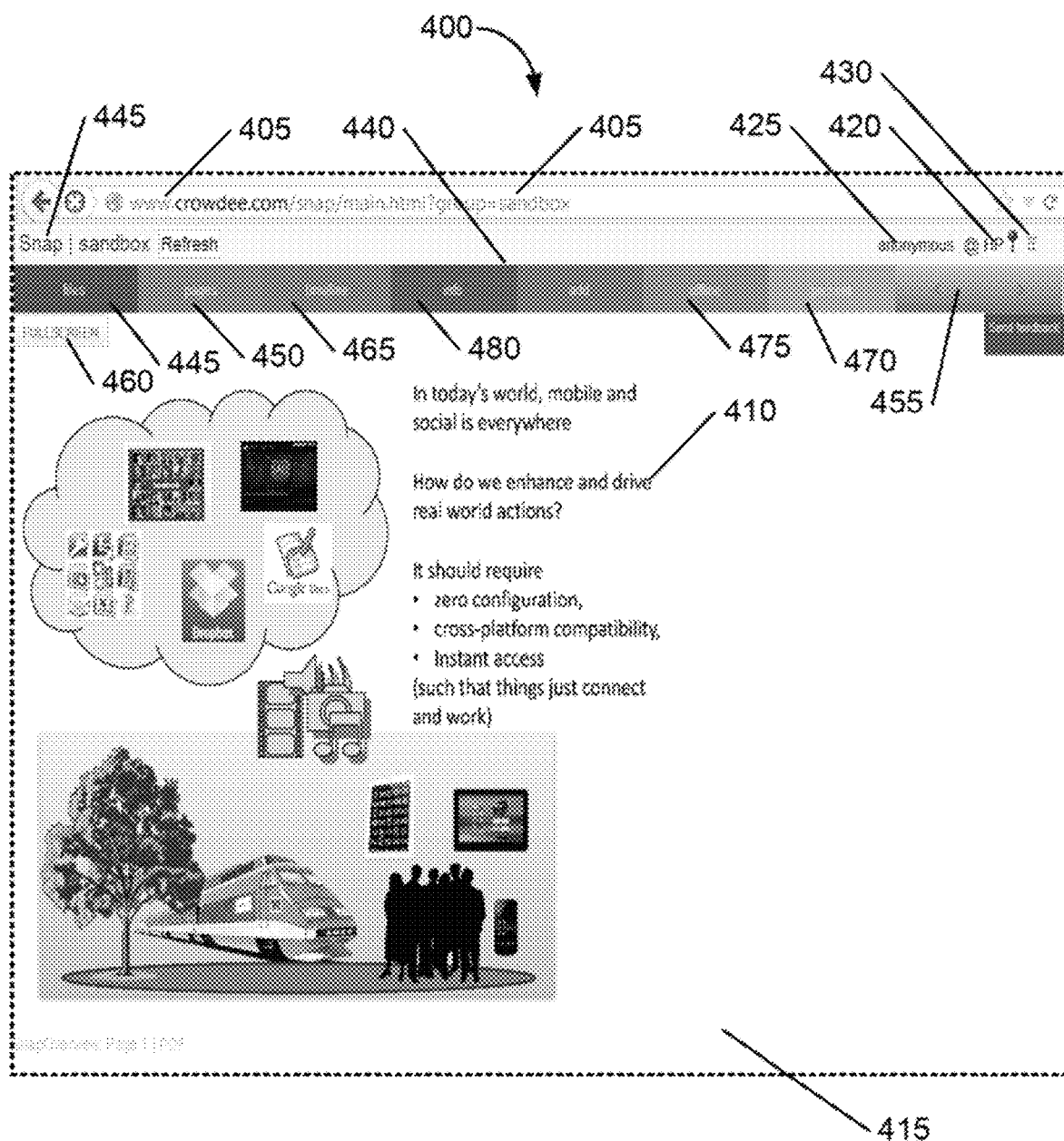
FIG. 4 illustrates a cross-platform web user interface for sharing content with the content sharing platform of FIG. 3 according to various examples.

Referring now to FIG. 3, a schematic diagram of a content sharing platform architecture in accordance with various examples is described. Content sharing platform 300 has various modules and services hosted on one or more servers, including, for example: (1) a User Interface Module 305; (2) a Real-Time Messaging Module 310; (3) a Native Bridge Module 315; (4) a Timeline and a User Management Module 320; (5) a Content Management Module 325; and (6) a Location Module 330. These modules are designed to run independently from each other and may be hosted on a dedicated server machine or in a dedicated cluster of machines, depending on expected or measured loads. As understood by one skilled in the art, splitting out the modules on multiple machines allows for the Real-Time Messaging Module 310 to incur as little external overhead as possible since it is latency sensitive.

In various examples, the content sharing platform 300 is hosted on a web server 335 connected to an optional proxy server 340. The proxy server 340 may be a standard web server (e.g., an Apache2 server) with mod_proxy and mod_rewrite modules to ensure that consistent URLs are exposed to users of the content sharing platform 300. The users may access the content sharing platform 300 through a URL request to the proxy server 340 on a number of mobile devices, such as for example, laptop 345, phone 350, tablet 355, and video game console 360, among others. The URL request directs the users of the content sharing platform 300 to a user interface implemented by the User Interface Module 305 and described in more detail herein below. It is appreciated that the proxy server 340 may be deployed as part of a cloud service and optionally be collocated with the web server 335. It is also appreciated that having proxy server 340 issue consistent URLs enables cookies issued by the various content sharing platform 300 modules to be shared among the modules.

The web server 335 may also be a standard web server (e.g., an Apache 2 server) with minimal dependencies on images and external libraries to facilitate replication and load balance. In an example implementation, the web server 335 may use the jQuery library to make Ajax calls and the Sockjs library to make socket calls to the Real-Time Messaging Module 310.

The Real-Time Messaging Module 310 is responsible for handling all events and messages through the content sharing platform 300 and provides a front-end for content upload and management. The Real-Time Messaging Module 310 may be implemented as a Node.Js server with two types of Application Programming Interfaces ("APIs"): a standard HTTP/Post/Get/Rest API and a WebSocket API through the Sockjs library. The two APIs enable various web clients (e.g., the mobile devices 345-360) to push events and messages through the Real-Time Messaging Module 310 without requiring the full WebSocket stack. The WebSocket API is used to receive notifications and messages in real-time. It is appreciated that polling with the Rest API may also be used for this purpose but with a loss in efficiency.

In various examples, the Real-Time Messaging Module 310 maintains state information about which clients are in which private social groups. The Real-Time Messaging Module 310 may be difficult to replicate across machines and is very latency sensitive, so it is recommended that it be implemented on a dedicated machine. Since the Sockjs library supports a distributed backend, the Real-Time Messaging Module 310 may be scaled out if needed.

The Native Bridge Module 315 provides a Native Bridge Application 365 implemented with a Javascript API deployed on mobile devices 345-360 to access native device features, such as, for example, the native camera and photo gallery applications on the mobile devices 345-360. Calls from the User Interface Module 305 to native code on a mobile device may be redirected through a URL redirect module (e.g., jsbridge://) to generate a platform agnostic custom URL. The redirected call may be handled by a runtime module that sends (e.g., by HTTP Post) the local results to a bridge server (not shown). The HTTP Post submits data to be processed to the bridge server. The URL redirect module may include a library to generate the custom URL. For example, the library may be a JavaScript library. The runtime module may be installed on the mobile device, and code for the runtime module may be unique to a device platform. For example, code for the runtime module may be unique for each Android, iOS, WebOS etc., based platform. The Native Bridge Module 315 also allows for bookmarklets to be added easily to shared content on Android based platforms. It further allows for a URL corresponding to a private social group to be written to an NFC tag.

The Timeline and User Management Module 320 may be implemented as a Django service embedded inside the web server 335 using a Web Server Gateway Interface ("WSGI"). The Timeline and User Management Module 320 is responsible for maintaining a consistent view of timelines for the content sharing platform 300 groups, storing notes and providing user authentication (e.g., via a social network login). It is appreciated that the Timeline and User Management Module 320 may also be deployed separately from the web server 335 if the server is replicated. The Timeline and User Management Module 320 may support jsonp cross domain calls, but if the proxy server 340 is present, regular Ajax calls may also be used.

The Content Management Module 325 is responsible for allowing upload and processing of content into the content sharing platform 300. The Content Management Module 325 also sends out notifications through the Real-Time Messaging Module 310 when new content is available. The Content Management Module 325 may be implemented as a set of Linux scripts using ImageMagick, OpenOffice, Poppler, and Ghostscript. It is highly parallelizable and distributable and in some cases it may be quite CPU intensive. The Content Management Module 325 includes a Content Upload Module 370, a Content Conversion Module 375, a Content Processing Module 380, and a Topic Extraction Module 385 for processing and managing content shared through the content sharing platform 300.

The Content Upload Module 370 provides a HTTP Post API used by the User Interface Module 305 when uploading files and by the Native Bridge Module 315 clients when posting photos or accessing other native device features. The Content Upload Module 370 is connected with the Real-Time Messaging Module 310 to push out notifications and messages whenever new content is available in a group. The module 315 may be implemented in Node.JS and python scripts.

The Content Conversion Module 375 is responsible for taking a document of any supported file type (e.g., 150+ file types such as RTF, JPG, PPT, etc.) as input and converting the document to a PDF. The Content Conversion Module 375 may internally use the OpenOffice v3 import and export libraries via the unoconv tool.

The Content Processing Module 380 takes a PDF as input directly from the Content Upload Module 370 or from the Content Conversion Module 375 after conversion from another file format. The Content Processing Module 380 first paginates the document and converts each page to a jpg image using, for example, a tool such as ImageMagick and Ghostscript. The image is thumbnailed in two additional resolutions for quicker loading in mobile devices and for thumbnail galleries. Text is then extracted from the PDF, associated annotations (such as speaker notes in power point files) and the actual document text. This text is then passed to the Topic Extraction Module 385 to extract Wikipedia links. The Content Processing Module 380 is also responsible for flipping photos taken in different orientations on mobile devices using exif metadata embedded in the photos by the Native Bridge Module 315.

The Topic Extraction Module 385 retrieves the most relevant Wikipedia links for an arbitrary chunk of text. Each link is also associated with a relevance or similarity score. If the similarity is below a threshold no links are returned. In one example, at most 10 links can be returned. A topic model for all of the English version of Wikipedia can be loaded into memory and be available using a Pyro4 based Key Value Store server (not shown) to extract topics in real-time. The Topic Extraction Module 385 may use a Latent Semantic Indexing ("LSI") model based on the gensim library to extract relevant topics.

Attention is now directed to FIGS. 4-17, which show the cross-platform web user interface according to various examples. User interface 400 is displayed in a web browser client in a mobile device (e.g., mobile devices 110*a-f* and 120*a-b*) upon a user entering a URL 405 corresponding to a private social group in the web browser client. The URL 405 directs the user to content being shared in the private social group, such as content 410 displayed in the user interface main window 415.

The user interface 400 is a cross-platform user interface that may be run on any web browser and platform, including, but not limited to, web browsers such as Internet Explorer, Mozilla Firefox, Google Chrome, and Safari, and platforms such as iOS and Android, among others. In addition, the same user interface 400 is run on different types of mobile devices, e.g., desktops, laptops, tablets, mobile phones, and so on. As appreciated by one skilled in the art, there may be some minor customizations done at the web browser client with regards to image resolution, compression, and other features tied to the mobile devices' display.

The first time a user visits the URL 405, the user is asked to share his/her location. The user is not required to do so, but sharing his/her location enables the user to more easily share content with other users. Once the user has accepted to share his/her location, a local group or place icon 420 may be displayed in the top right corner of the user interface 400. The local group or place icon 420 may identify the user's physical location (e.g., physical space 100) or it may be a custom place created and pinned to a geographic location. The local group could also be a pre-existing place such as a venue in Foursquare or, as described above with reference to FIG. 1, an arbitrary identifier for a local group shared among a set of people to broadcast URLs corresponding to content groups (e.g., a local group of meeting attendees sharing the meeting presentation slides).

It is appreciated that the local group identifies who is located in the same place and enables local content sharing. This place can be a public venue such as a restaurant in Foursquare or it can be a place the user created and tagged to a geolocation. By tagging a local group to a geolocation, the group becomes discoverable through vicinity searches. The local group may also be virtual to allow remote users to participate in the group. These virtual local groups can thus be seen as a virtual team that meets regularly. The user can broadcast the local group name to anyone in a location or selectively pick users to invite.

The user interface 400 displays a username 425 to the left of the local group icon 420. The username is set to "anonymous" by default. The user can click on the displayed username to set it as desired. Alternatively, the user can click on Settings icon 430 in the top right of the user interface 400 screen. Doing so opens up pop-up window 500 shown in FIG. 5 and from which the user can login using his/her social network (e.g., Facebook) credentials at 505.

The user can get more information about the group by clicking on the local group icon 420. Doing so opens up a pop-up window 600 shown in FIG. 6. Pop-up window 600 displays the user's location at 605, allows the user to refresh his/her location at 610, see nearby locations at 615, view current group numbers at 620, invite other members at 625, see a QR code corresponding to the group name at 630, write a NFC tag at 635, create a new group location at 640, and generate a new location name at 645. The user can also broadcast the group's name to other collocated users.

If desired, the user can at any time join or create another group with which to share content. The user can do so by clicking on the icon "Snap" 435 (FIG. 4) below the URL 405. Clicking on icon 435 opens up a pop-up window 700 shown in FIG. 7 that allows the user to join another group by typing the group name in window 705 and clicking on the "Join" icon 710, or generate a new group name by clicking on the "Generate group name" icon 710. The new group name appears in window 705, at which point the user can click on the Join icon 710 to join the newly created group. When the user joins a new group, a new window 800 shown in FIG. 8 opens up to allow the user to add content to be shared with the group. The new window 800 shows the new group name 805 and the URL 810 corresponding to the group. Other users can join this newly created group as described above with reference to FIG. 2.

Figure 5:
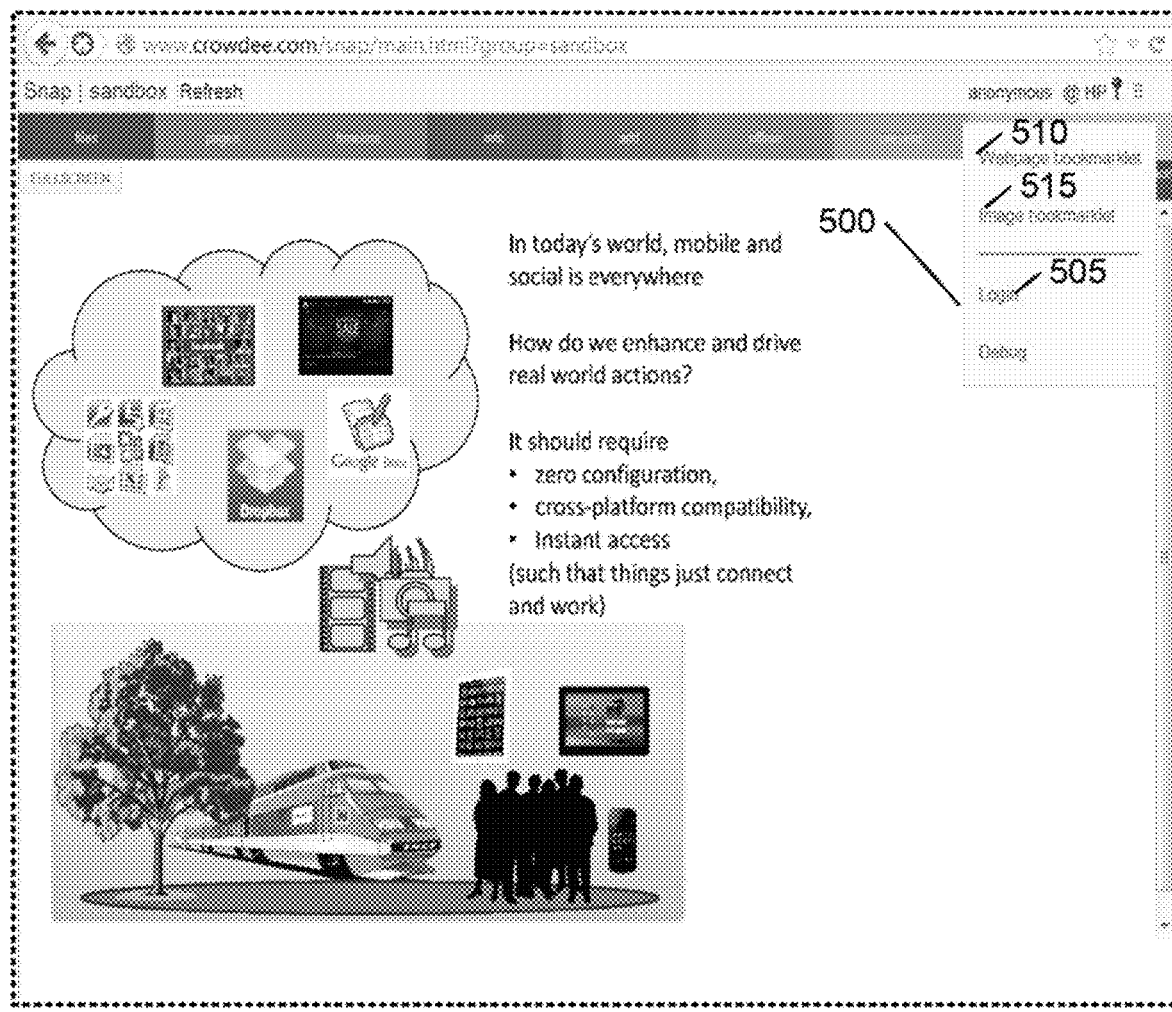
FIG. 5 illustrates a user interface window displayed when a user clicks on a Settings button of the web user interface of FIG. 4.
Figure 6:
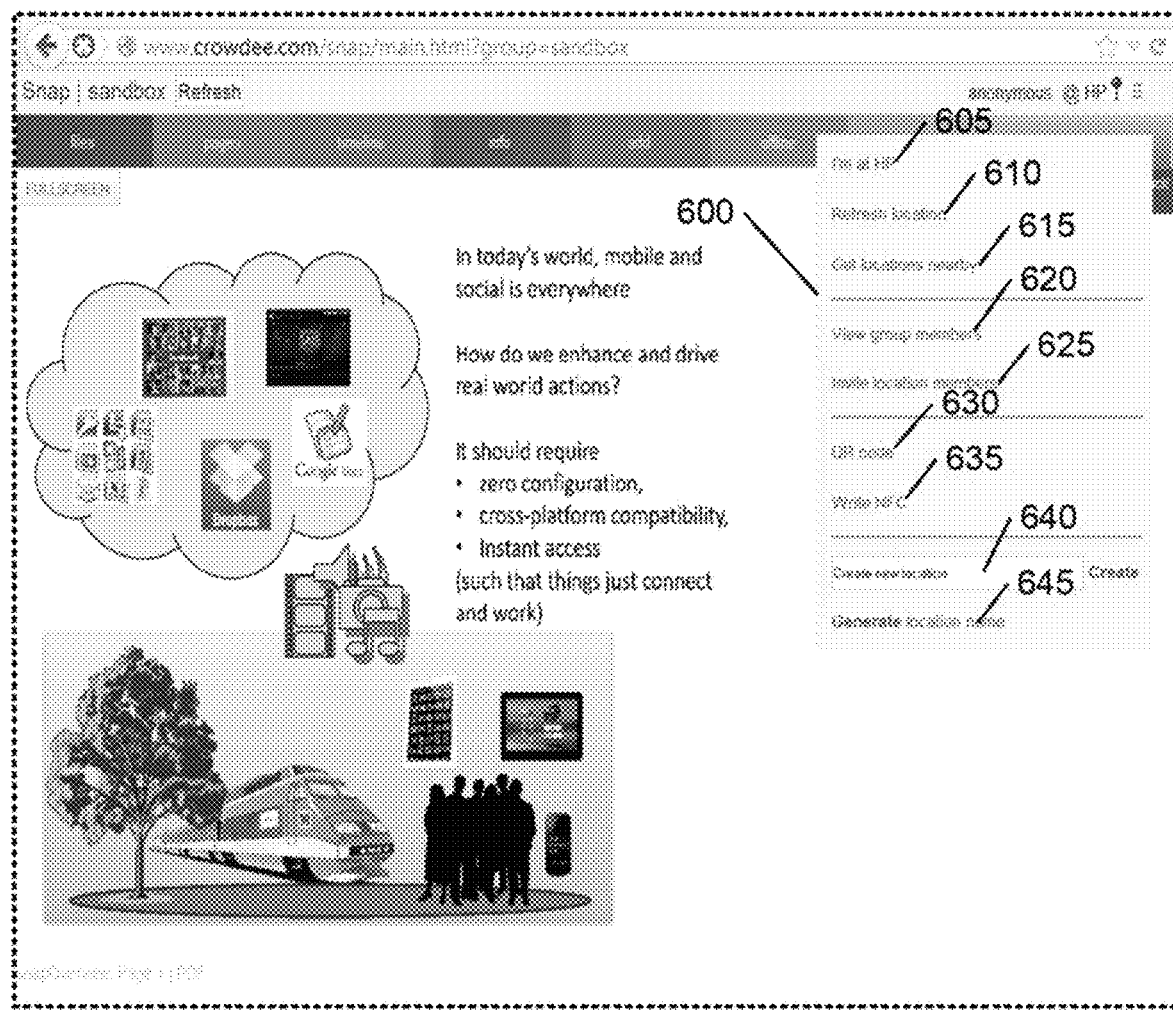
FIG. 6 illustrates a user interface window displayed when a user clicks on a local group icon of the web user interface of FIG. 4.
Figure 7:
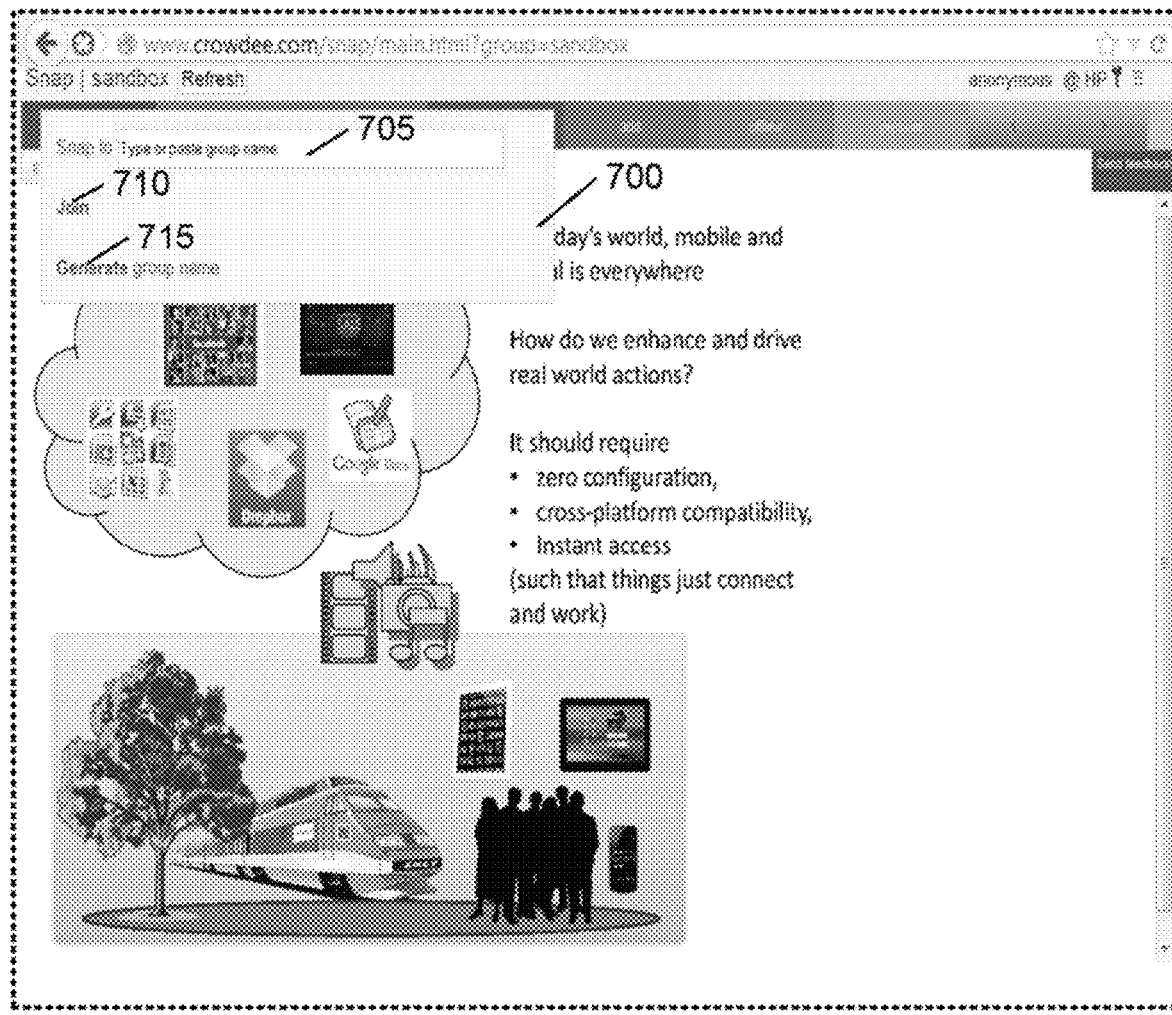
FIG. 7 illustrates a user interface window displayed when a user clicks on a icon of the web user interface of FIG. 4.
Figure 8:
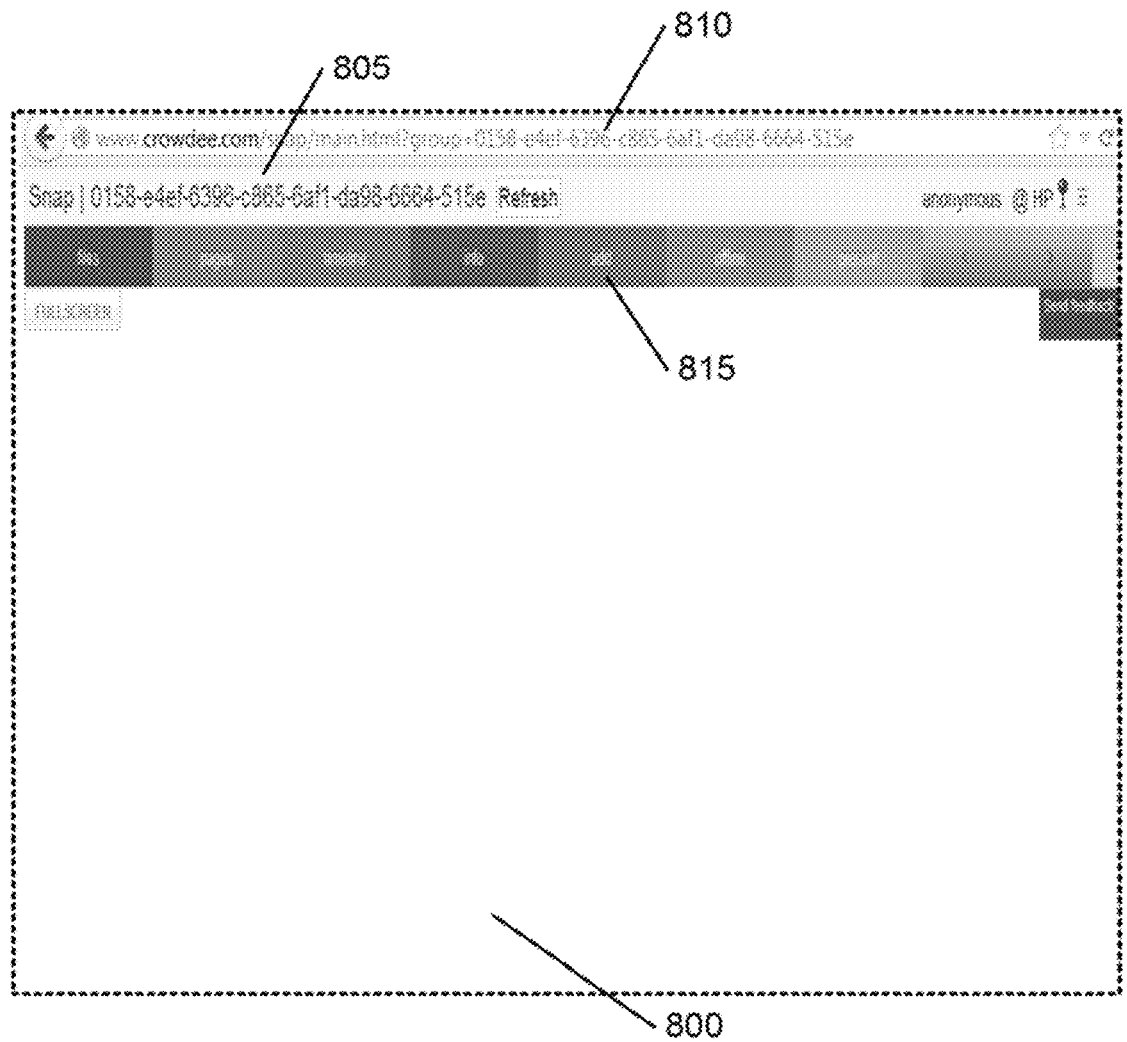
FIG. 8 illustrates a user interface window displayed when a user clicks on a Join icon of the web user interface window of FIG. 7.
Figure 9:
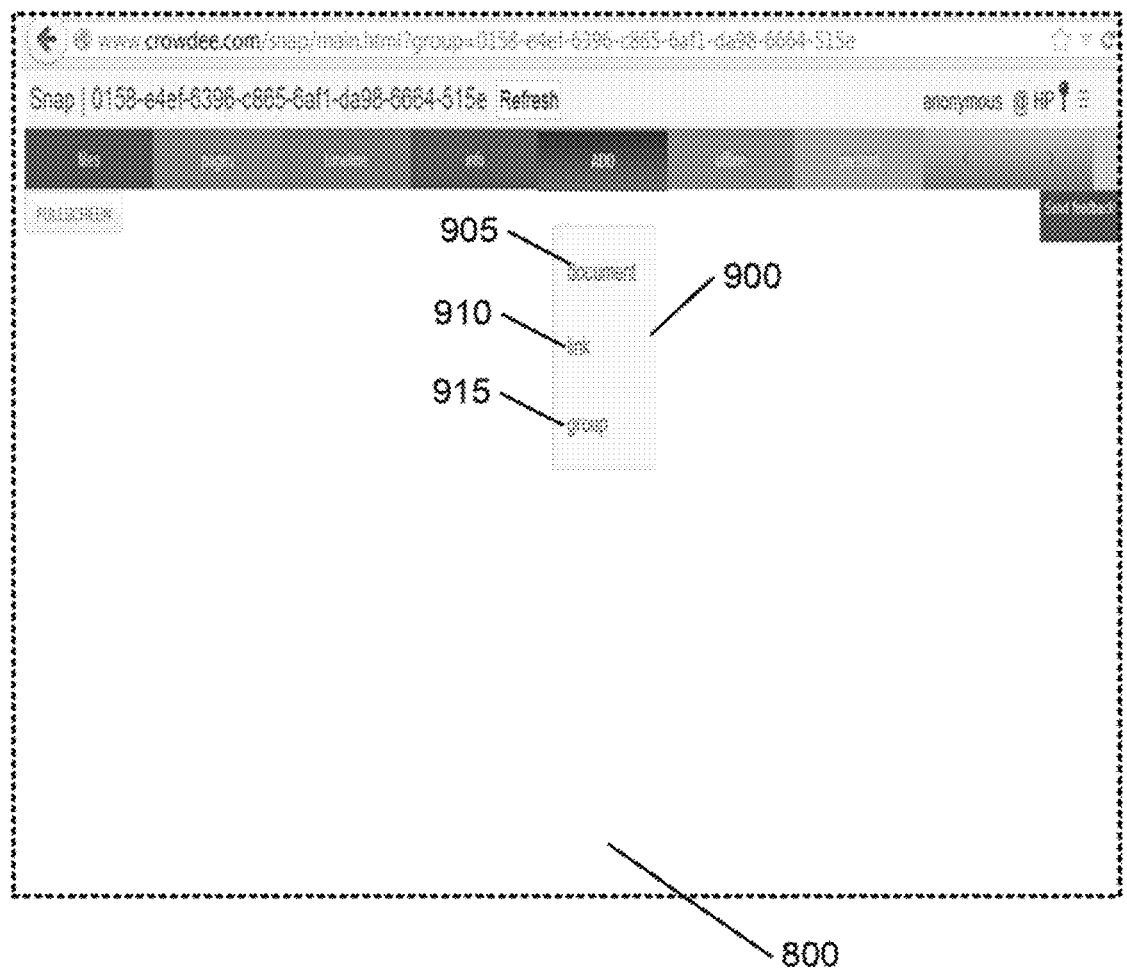
FIG. 9 illustrates a user interface window displayed when a user clicks on a Add button of the web user interface window of FIG. 8.
Figure 10:
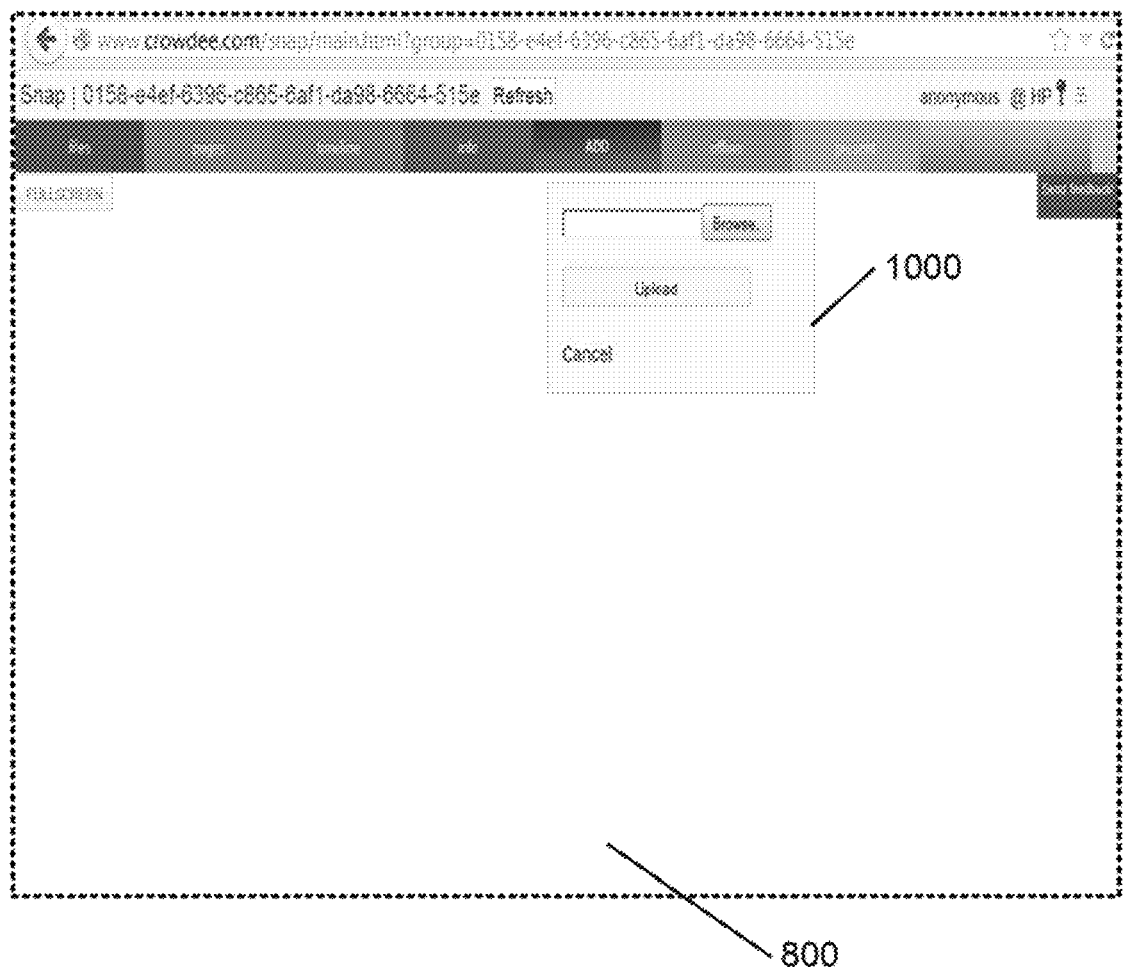
FIG. 10 illustrates a user interface window displayed when a user clicks on a Document icon of the web user interface window of FIG. 9.
Figure 11:
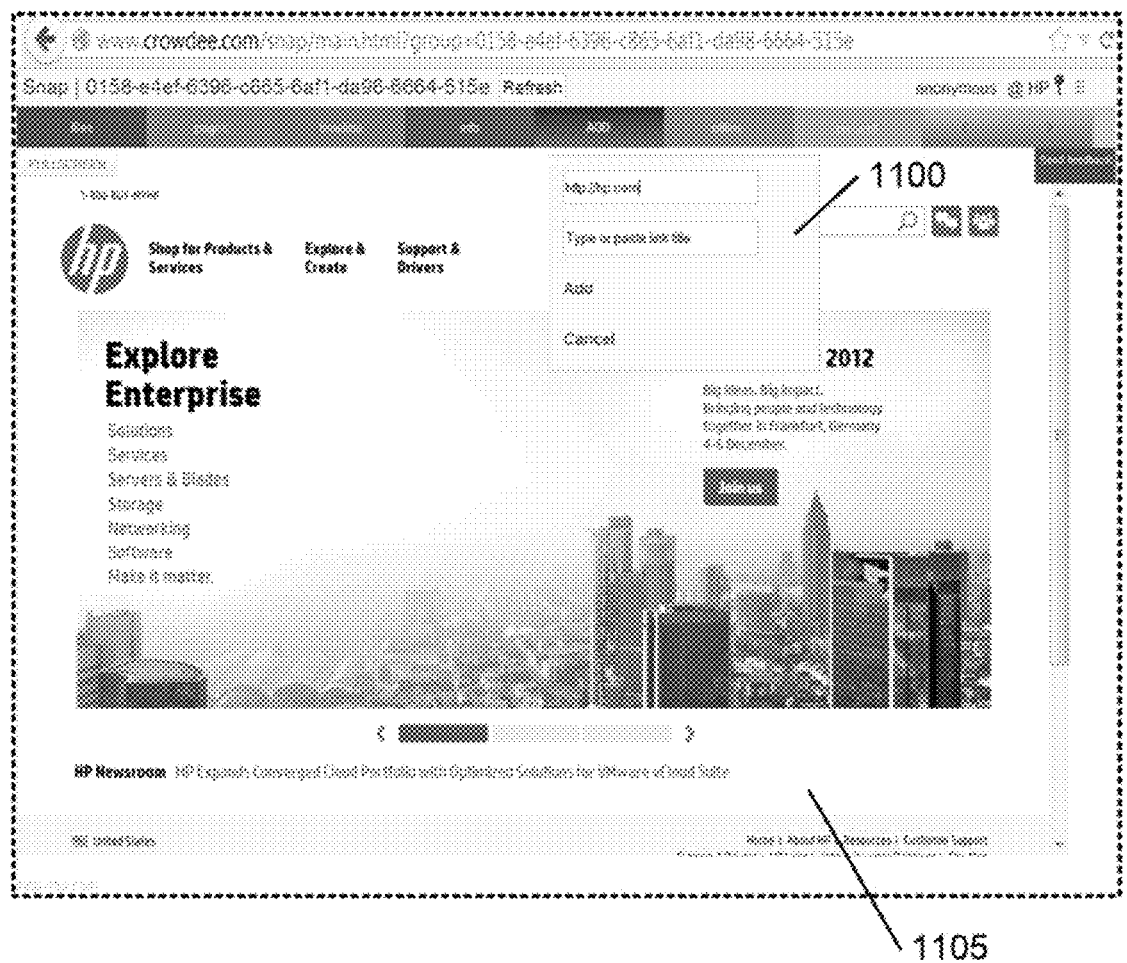
FIG. 11 illustrates a web interface window displayed when a user clicks on a Link icon of the web user interface window of FIG. 9.
Figure 12:
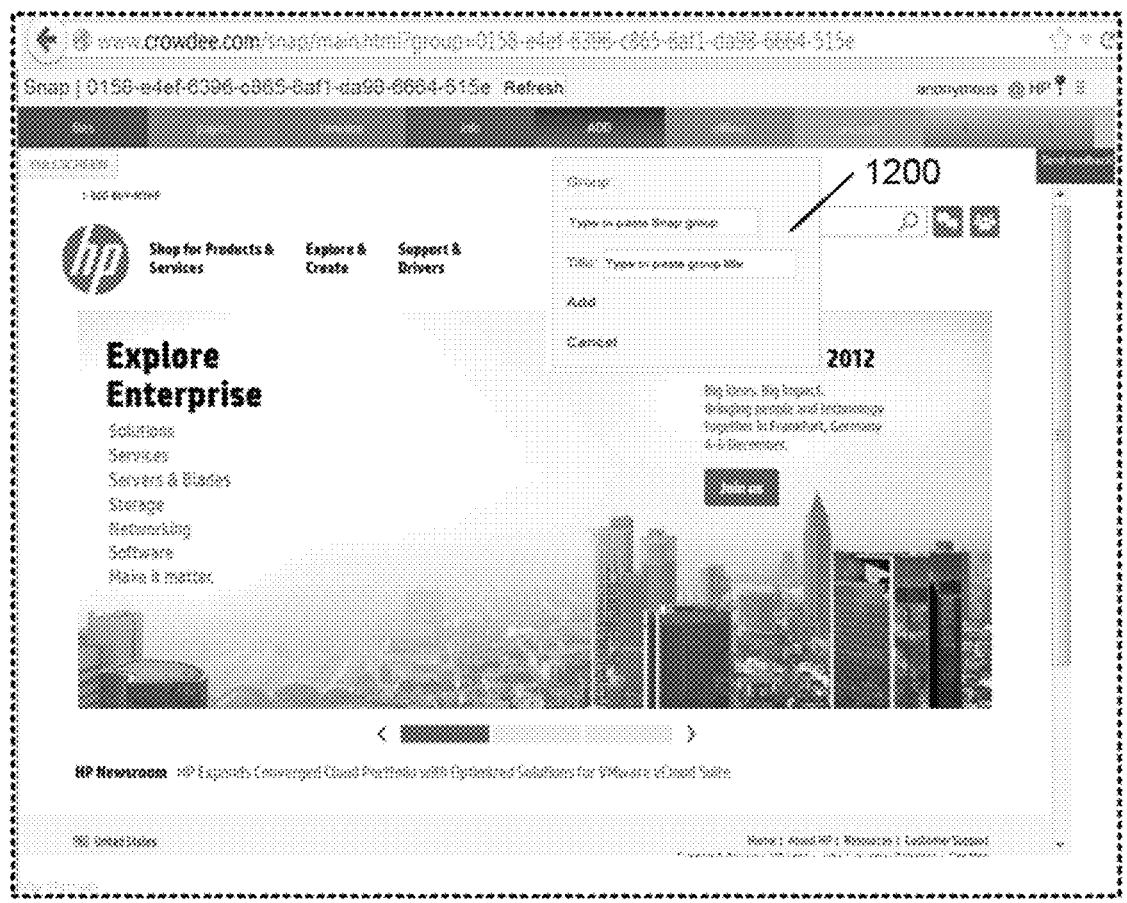
FIG. 12 illustrates a web interface window displayed when a user clicks on a Group icon of the web user interface window of FIG. 9.
Figure 13:
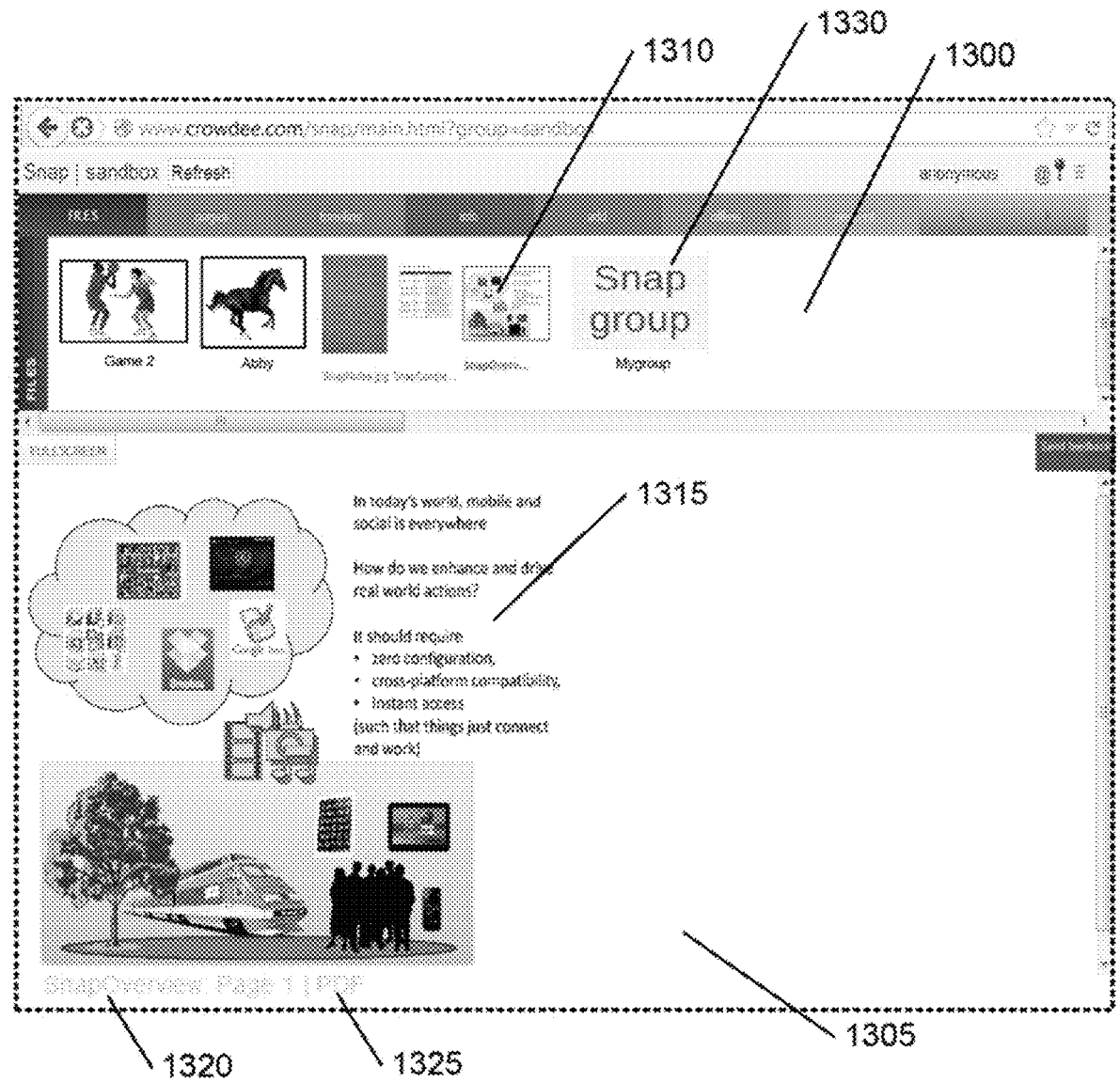
FIG. 13 illustrates a web interface window displayed when a user clicks on a Files button of the web user interface of FIG. 4.

Window 800 is initially blank until a user in the group decides to add content by clicking on the Add button 815. Doing so opens up a pop-up window 900 shown in FIG. 9 to allow the user to add content by clicking on "Document" icon 905, "Link" icon 910, or "Group" icon 915. Clicking on Document icon 905 opens up a pop-up window 1000 shown in FIG. 10 to allow the user to upload files directly from the user's mobile device. The user can also take a picture with the camera in the user's mobile device and automatically display the picture in window 800 with the Native Bridge Application 365 (FIG. 3) in the user's mobile device, or add content with bookmarklets at 510-515 (FIG. 5). Clicking on link icon 910 opens up a pop-up window 1100 shown in FIG. 11 to allow the user to enter the URL of a web page (e.g., http://hp.com that is displayed in window 1105. And clicking on Group icon 915 opens up a window 1200 shown in FIG. 12 to allow the user to enter a new group and view the content in that group. Users may also add web pages with bookmarklets by clicking on any arbitrary currently viewed web page from the users' browser bookmarks bar.

Referring back to FIG. 4, the user has a number of options to navigate and interact with the content being displayed in the user interface 400. The options are shown in a top menu 440 displayed at the top of the user interface 400. For example, the user can select the Files button 445 in top menu 440 to view all content uploaded into the local group 420 in a Files window 1300 shown in FIG. 13. The content may include text documents, multimedia documents, images, video, etc., in any file format such as, for example, pdf, ppt, doc, xls, jpg, png, gif, and so on. The user can select one of the content files displayed in the Files window 1300 to view the content in the main window 1305. For example, the user can select content file 1310 to see the first page 1315 of the file 1310 displayed in the main window 1305. The user can also select a link 1320 to the original image 1315 displayed in the main window 1305 to view the image 1315 in a separate web browser tab or window, or when applicable, the user can select a link "PDF" 1325 to view the page 1315 as a PDF document.

In various examples, the content displayed in the Files window 1300 may also include links to other content groups, such as link 1330. A user may click on the link 1330 to open up a new page directing the user to another content group, e.g., the group named "Mygroup" with the URL http://www.crowdee.com/snap/main.html?group=mygroup. One skilled in the art appreciates that this feature enables users to create arbitrary hierarchical indexes of related content groups within Files window 1300.

Figure 14:
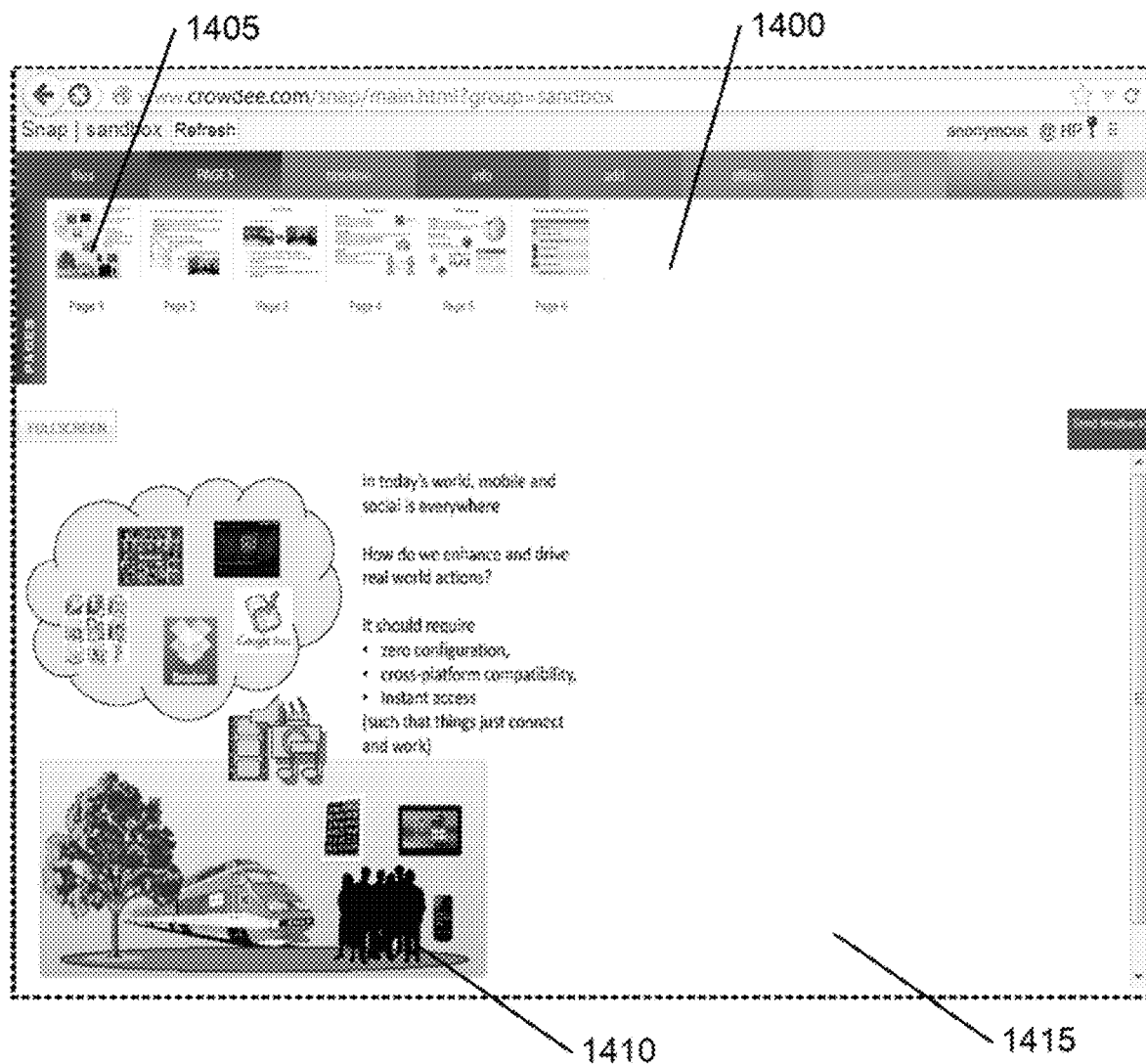
FIG. 14 illustrates a web interface window displayed when a user clicks on a Pages button of the web user interface of FIG. 4.
Figure 15:
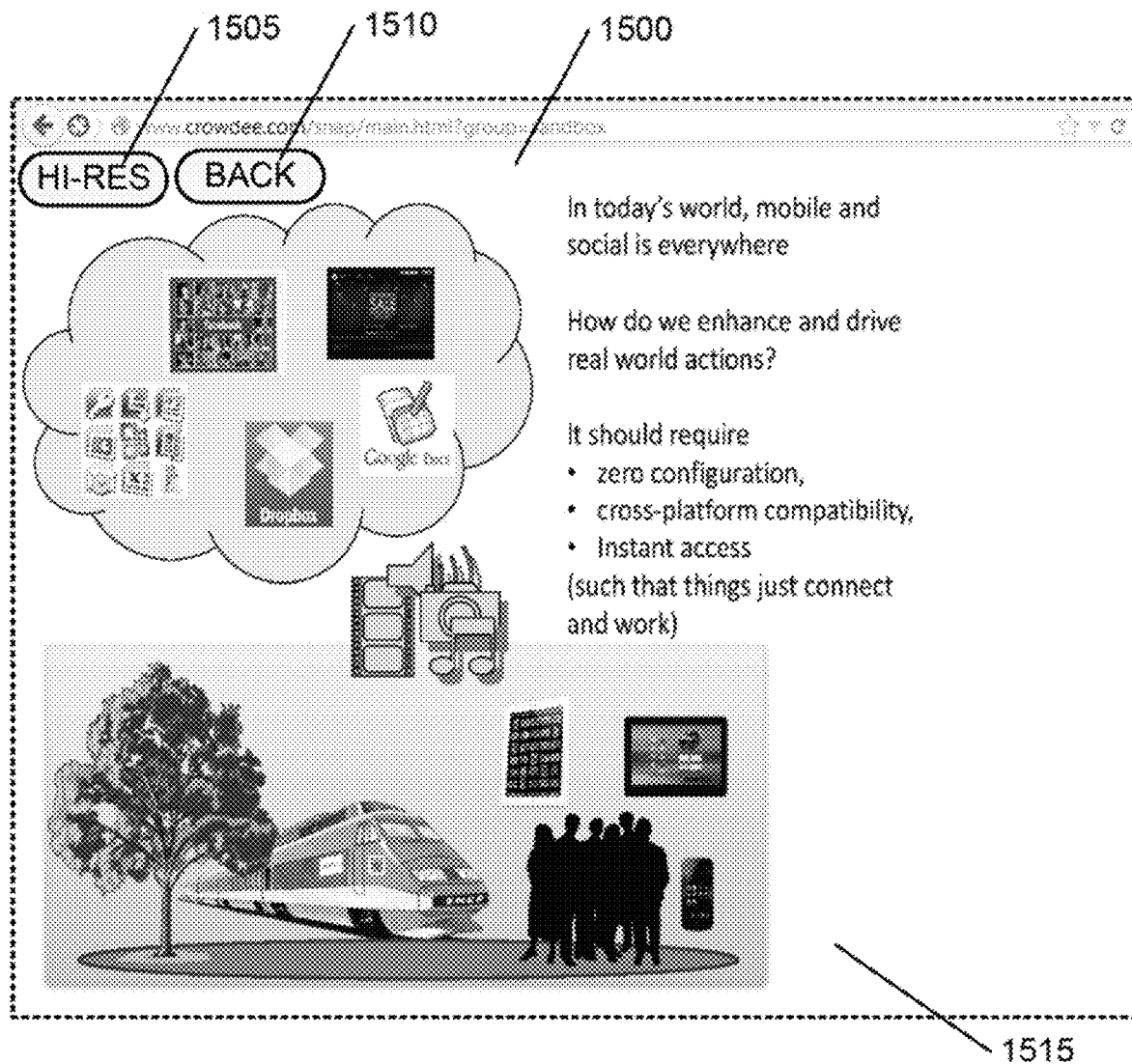
FIG. 15 illustrates a web interface window displayed when a user clicks on a Fullscreen button of the web user interface of FIG. 4.
Figure 16:
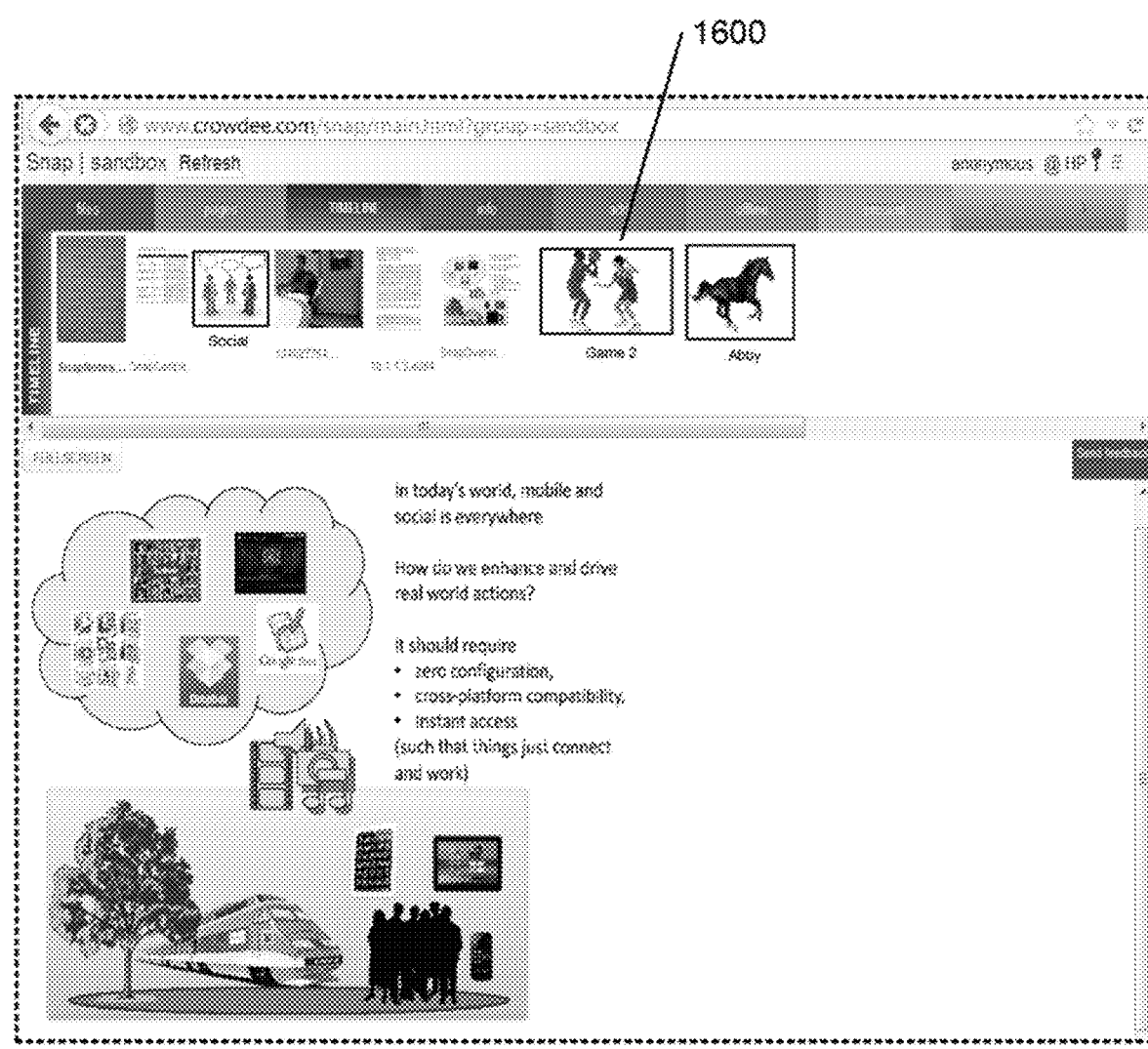
FIG. 16 illustrates a web interface window displayed when a user clicks on a Timeline button of the web user interface of FIG. 4.
Figure 17:
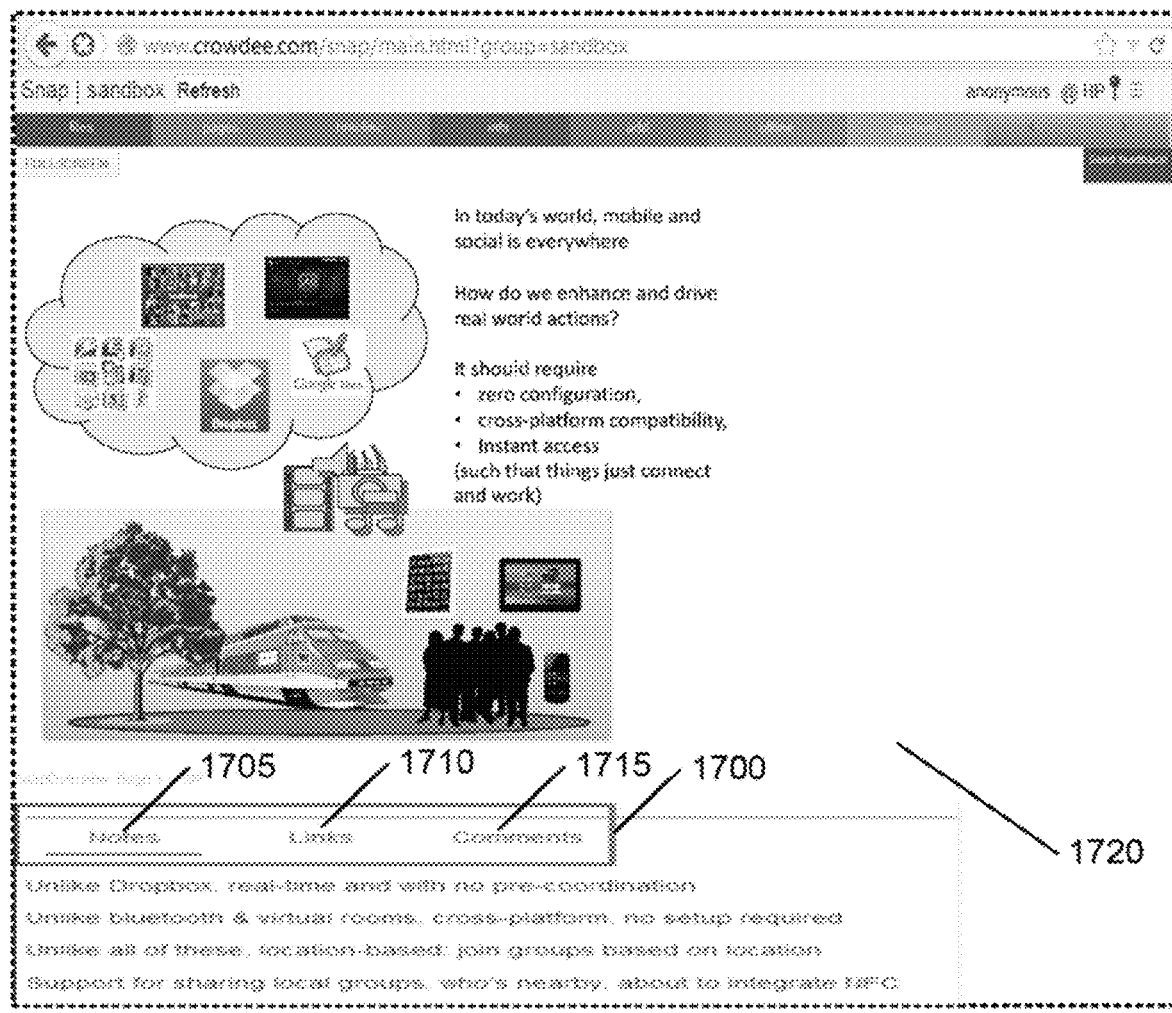
FIG. 17 illustrates a web interface window displayed when a user clicks on an Info button of the web user interface of FIG. 4.

It is appreciated that each content file in the Files window 1300 may have multiple pages. The user can click on the Pages button 450 in top menu 440 to view thumbnails of all pages in the document in a Pages window 1400 shown in FIG. 14. Selecting a page thumbnail 1405 displays the corresponding page 1410 in the main window 1415 as shown in FIG. 14.

It is also appreciated that the content view displayed in main window 415 may appear as a slideshow for easy navigation by the users. To navigate between pages, the user can use the "<" and ">" icons 455 in the top menu 440 of the user interface 400. The user can also optionally navigate the content being displayed in main window 415 with the typical behavior of a Powerpoint presentation by using the arrow, space, enter, PageUp, PageDown, Home, and End keys in a keyboard associated with the user's mobile device. Certain tablets, phones and other mobile devices may allow the user to swipe the devices' screen to navigate the content.

The user can also enter and exit a fullscreen mode by pressing the "FULLSCREEN" button 460. Doing so opens up window 1500 shown in FIG. 15 in the web browser client. In fullscreen mode, the user can also click on an optional "HI-RES" button 1505 to view a higher resolution image (e.g., when presenting the content on a projector). The HI-RES button 1505 slowly fades away in fullscreen mode, so the user needs to click or touch the main window 1515 once to see it again. Clicking on the "BACK" button 1510 takes the user out of fullscreen mode.

As described herein above, the user has access to history-aware and context-aware features of the content displayed in the main window 415. The history-aware features include a timeline of all uploaded and shared content so users in the group 420 can revisit the content shared at any time. The user can select the Timeline button 465 in the top menu 440 of user interface 400 to see the history of content shared in the group in a Timeline window 1600 shown in FIG. 16. History is recorded when the users are in a "present" mode. To enter the present mode, a user can select the Present button 470 in the top menu 440 of the user interface 400. Doing so highlights the Present button 470 to notify the user that he/she is in the present mode, records the users' content sharing actions for the group 420 and broadcasts them live to all members in the group. To leave the present mode, the user can simply click on the Present button 470 again.

In contrast to the present mode, users have the option to view content displayed in the main window 415 by being in an offline mode. The user can enter the offline mode by clicking on the Offline button 475 in the top menu 440 of user interface 400. Doing so highlights the Offline button 470 to notify the user that he/she is in the offline mode. The offline mode allows the users to view the content in the main window 415 without seeing notifications from other members in the group and browse the content undisturbed. The user can leave the offline mode by clicking on the Offline button 470 again. It is appreciated that being in the offline mode still allows for content history to be recorded.

The context-aware features of the content displayed in the main window 415 may include notes, annotations or comments from users in the group, related links (e.g., Wikipedia links) about topics in the content being shared, instant messaging conversations between users in the group, or any other information and metadata about the content. The user can see those features by clicking on the Info button 480 in the top menu 440 of the user interface 400. Doing so allows the user to see additional information and metadata about the content displayed in main window 415, such as, for example, context-aware features 1700 shown in FIG. 17 and including notes 1705, links 1710, and comments 1715 displayed below the content in main window 1720.

It is appreciated that the user interface 400 described above with reference to FIGS. 4-17 is designed to securely share documents in private groups. Thus all analytics and document processing is contained within the groups. Groups are not discoverable but there are various mechanisms to share groups. It is up to the group members how securely they want to share their group. Anyone with access to the group URL has full access to the content, with the exception of web pages that might require some authentication. Hence it is important to not distribute this URL too widely, i.e., on a public crawlable web page if it desired that the URL remains private. Emailing and SMS-ing the link is safe, but in some situations users may not even want to do that. In such cases, users can encode the URL as a QR code or an NFC tag that only people in the users' physical vicinity have access to.

Users are encouraged to select group names that make their identity hard to guess, e.g., GUID-based group ids. All links are redirected to external servers so the URL containing the secret group name does not leak out in the HTTP referrer header. This applies for web page thumbnails, links clickable on inside the web pages, and links popping out of embedded web pages in a separate window.

It is also appreciated that for enterprise use cases, these security guarantees may not be strong enough. In these cases, the content sharing platform described herein can be deployed in an enterprise intranet.

Figure 18:
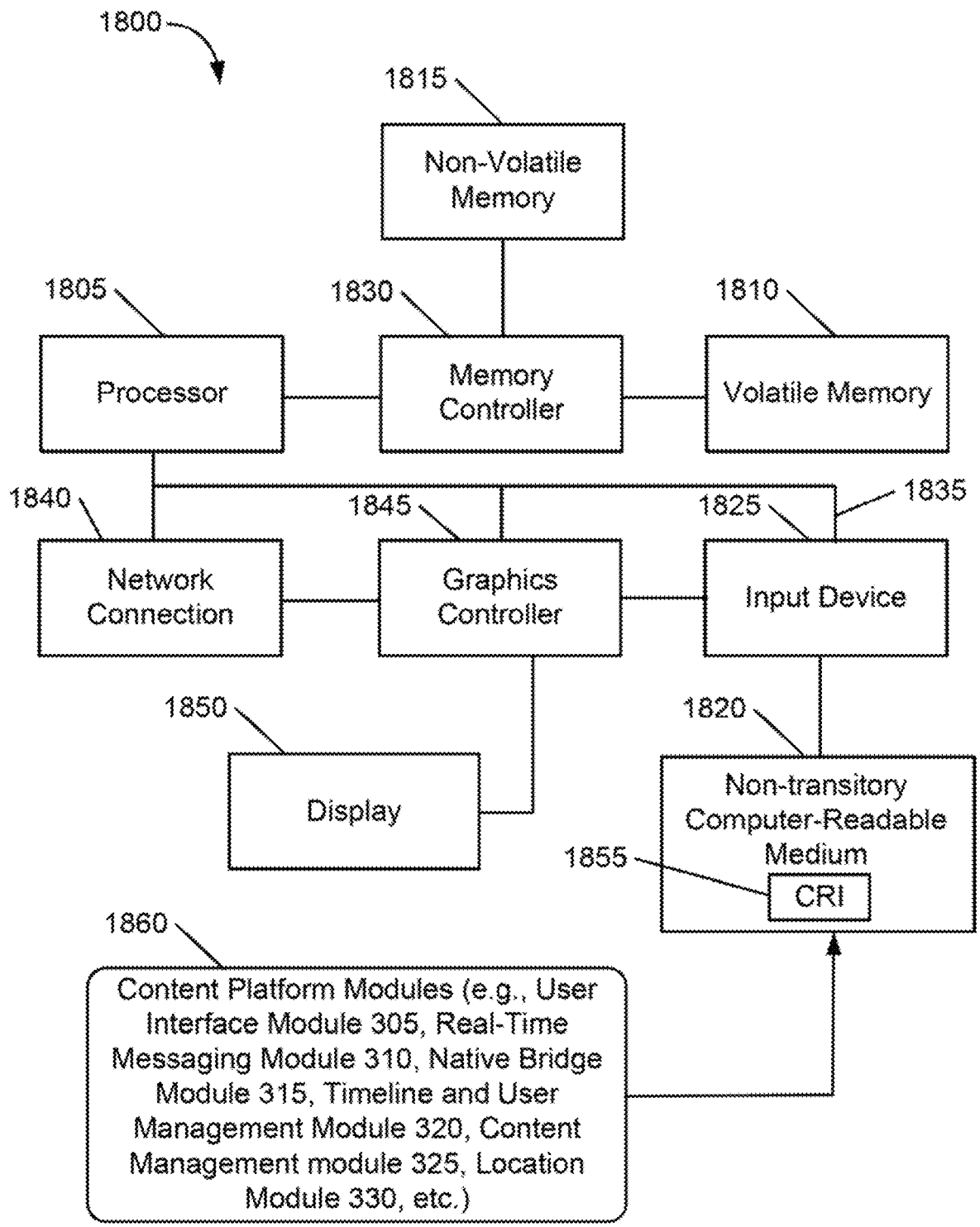
FIG. 18 illustrates a block diagram of an example computing system for hosting the modules of FIG. 3 according to various examples.

As described above, the modules used in the content sharing platform 300 in FIG. 3 may be hosted in a web server. Referring now to FIG. 18, a block diagram of an example computing system for hosting the modules of FIG. 3 according to various examples of the present disclosure is described. The computing system 1800 (e.g., a desktop computer, a laptop, a multi-core processing system, a tablet, a smart phone, a mobile device, a gaming system, etc.) can include a processor 1805 and memory resources, such as, for example, the volatile memory 1810 and/or the non-volatile memory 1815, for executing instructions stored in a tangible non-transitory medium (e.g., volatile memory 1810, non-volatile memory 1815, and/or computer readable medium 1820) and/or an application specific integrated circuit ("ASIC") including logic configured to perform various examples of the present disclosure.

A machine (e.g., a computing device) can include and/or receive a tangible non-transitory computer-readable medium 1820 storing a set of computer-readable instructions (e.g., software) via an input device 1825. As used herein, the processor 1805 can include one or a plurality of processors such as in a parallel processing system. The memory can include memory addressable by the processor 1805 for execution of computer readable instructions. The non-transitory computer readable medium 1820 can include volatile and/or non-volatile memory such as a random access memory ("RAM"), magnetic memory such as a hard disk, floppy disk, and/or tape memory, a solid state drive ("SSD"), flash memory, phase change memory, and so on. In some examples, the non-volatile memory 1815 can be a local or remote database including a plurality of physical non-volatile memory devices.

The processor 1805 can control the overall operation of the computing system 1800. The processor 1805 can be connected to a memory controller 1830, which can read and/or write data from and/or to volatile memory 1810 (e.g., RAM). The memory controller 1830 can include an ASIC and/or a processor with its own memory resources (e.g., volatile and/or non-volatile memory). The volatile memory 1810 can include one or a plurality of memory modules (e.g., chips). The processor 1805 can be connected to a bus 1835 to provide communication between the processor 1805, the network connection 1840, and other portions of the computing system 1800. The non-volatile memory 1815 can provide persistent data storage for the computing system 1800. Further, the graphics controller 1845 can connect to a display 1850.

Each computing system 1800 can execute computer-readable instructions that are stored on a non-transitory computer-readable medium 1820. The non-transitory computer-readable medium 1820 can be integral, or communicatively coupled, to computing device 1800, in either a wired or wireless manner. For example, the non-transitory computer-readable medium 1820 can be an internal memory, a portable memory, a portable disk, or a memory located internal to another computing resource (e.g., enabling the computer-readable instructions to be downloaded over the Internet).

The non-transitory computer-readable medium 1820 can have computer-readable instructions 1855 stored thereon that are executed by the processor 1805 to implement the modules of content sharing platform 300 (e.g., Time Messaging Module 310, Native Bridge Module 315, Timeline and User Management Module 320, Content Management module 325, Location Module 330, etc.) according to the present disclosure. The non-transitory computer-readable medium 1820, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 1820 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

Advantageously, the methods and modules of the content sharing platform 300 presented herein enable users to share and discuss a stream of content in real-time within private ad-hoc groups in a given location. The content sharing platform 300 is compatible with many types of mobile devices (e.g., laptops, mobile phones, tablets, etc.), operating systems (e.g., iOS. Android, etc.), web browsers (e.g., Internet Explorer, Mozilla Firefox, Safari, Google Chrome, etc.), and screen sizes (e.g., small to large). Users may instantly access the content sharing platform 300 without requiring any prior configuration. The content sharing platform 300 provides an interactive and collaborative content-sharing experience that is context-aware and history-aware, all with instant access and set-up.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. For example, it is appreciated that the present disclosure is not limited to a particular computing system configuration, such as computing system 1800.

What is claimed is:

1. A system for sharing content between collocated mobile devices in an ad-hoc private social group, comprising:
    a processor; and
    a set of modules hosted in a server and implementing instructions executable by the processor, the set of modules comprising:
        a web user interface module to enable users of collocated mobile devices to share, interact, and collaborate with content in a content group such that all users in the content group share, interact and collaborate with real-time user context-enhanced and timeline-enhanced content without a leader that controls content sharing in the group, and to display users' interactions with the content in real-time of all users in the content group in a manner that each interaction of a user with the content is displayed to the other users in the content group;
        a native bridge module to access native mobile device features from the web interface module by redirecting calls to the native mobile device features through a native redirect module that generates a platform agnostic custom uniform resource locator to access the native mobile device features, the redirected calls being handled by a runtime module sending data regarding the redirected calls to bridge server to process the data regarding the redirected calls;
        a real-time event messaging module to process events generated through the web interface module; and
        a content management module to process the content through the real-time event messaging module.

2. The system of claim 1, wherein the set of modules comprises a timeline and user management module to maintain a timeline of content sharing actions for the collocated mobile devices.

3. The system of claim 1, wherein the native bridge module comprises a native bridge application in the collocated mobile devices.

4. The system of claim 1, wherein the content management module comprises a content upload module to upload content to the web user interface module, a content conversion module to convert content from a first format into a second format, and a content processing module to extract text for a topic extraction module to determine topics related to the extracted text.

* * * * *